(No Model.)

J. W. RHODES.
WHEEL.

No. 481,822. Patented Aug. 30, 1892.

ATTEST
Helen Graham
W. W. Graham

INVENTOR
JOHN W. RHODES
By L. P. Graham
his attorney

THE NORRIS PETERS CO., PHOTO-LITHO., WASHINGTON, D. C.

UNITED STATES PATENT OFFICE.

JOHN W. RHODES, OF HAVANA, ILLINOIS.

WHEEL.

SPECIFICATION forming part of Letters Patent No. 481,822, dated August 30, 1892.

Application filed May 1, 1890. Serial No. 350,141. (No model.)

*To all whom it may concern:*

Be it known that I, JOHN W. RHODES, of Havana, in the county of Mason and State of Illinois, have invented certain new and useful Improvements in Wheels, of which the following is a specification.

This invention consists in certain details of construction and combinations of parts hereinafter set forth and claimed, the object being to produce a light, strong, and durable metallic wheel.

Figure 1:
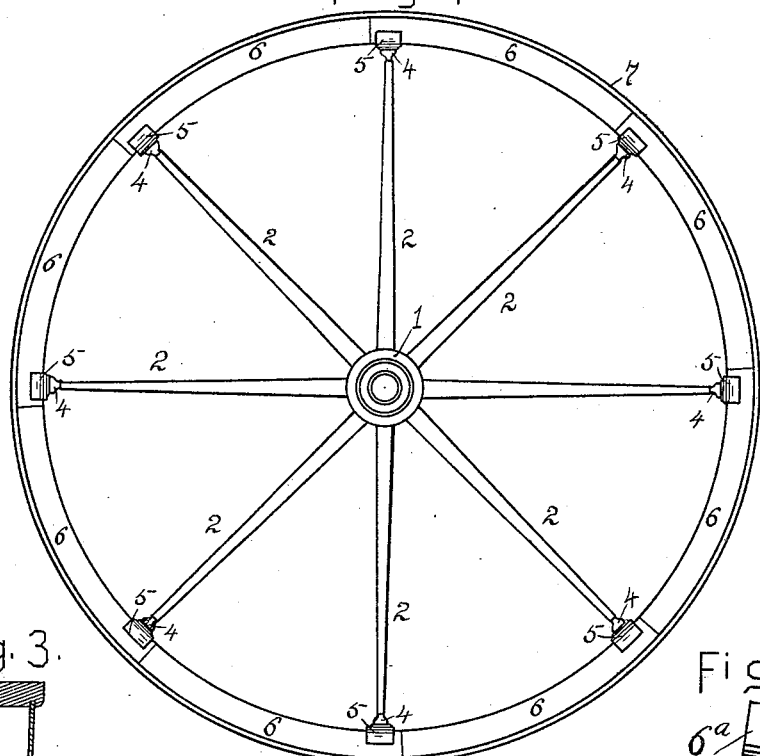
Figure 3:
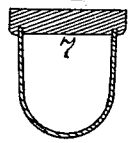
Figure 4:
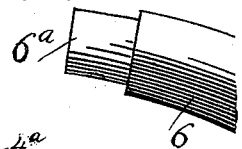
Figure 2:
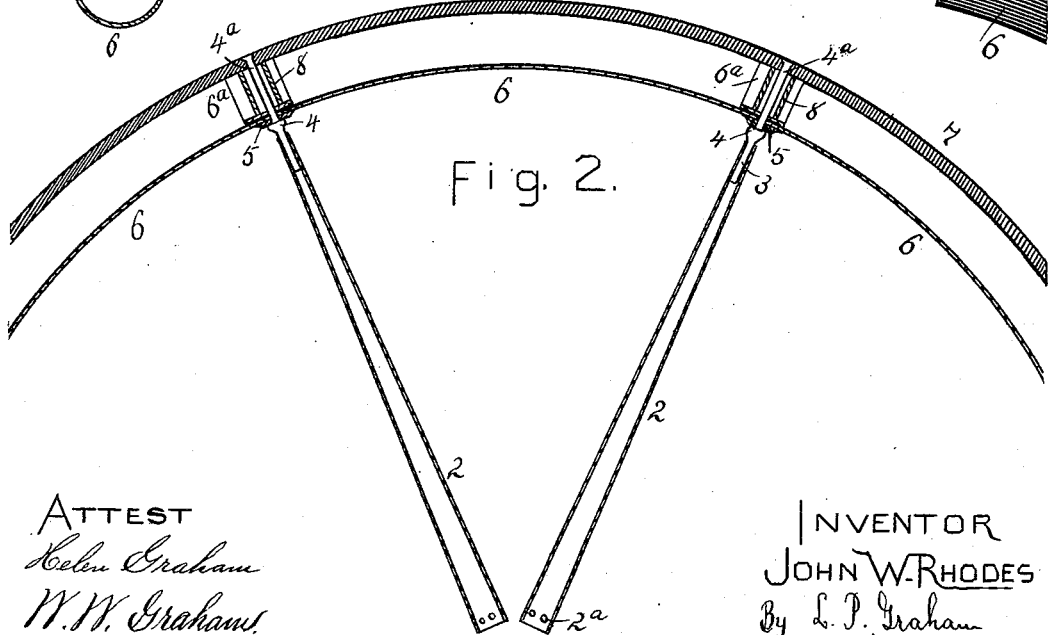

In the drawings accompanying and forming a part of this specification, Figure 1 is a side view of a wheel constructed in accordance with my invention. Fig. 2 is a vertical section through a fragment of a wheel. Fig. 3 is a cross-section through the tire and felly, and Fig. 4 is a side view of an end of a felly.

The hub 1 is of cast metal. The spokes 2 are tapering and tubular throughout a portion of their lengths, and their solid outer ends extend through both tire 7 and felly 6 and bind the same together. They are made by welding together a solid rod 3 and a preferably tapered tube. The fellies are of concavo-convex form in cross-section, and when composed of more than one piece they each have a diminished end $6^a$, that fits in the end of the felly next adjoining. The tires may have grooves or rabbets to receive the edges of the fellies, as seen in Fig. 3. Struts 8 surround the binding portions of the spokes and prevent the fellies from collapsing.

In the construction of the wheel the tire is first rounded, the holes are punched for the spokes, the felly is placed inside the tire, the spokes, washers, and struts are placed in position and the tire and felly riveted together by the spokes, the hub is cast on the ends of the spokes, and finally the ends of the tire are welded together, preferably by electricity. During the casting of the hub the spokes are plugged at the proper place with clay or otherwise, and the holes 2 may receive metal and increase the stability of the connections.

The felly-sections may be very light without impairing their usefulness, their function being largely to prevent accumulation of dirt.

It will be readily seen that the various elements may be modified without affecting the general construction of the wheel—as, for instance, the spokes may be solid, the felly may be made continuous, and the hub may be formed otherwise than by casting around the ends of the spokes. For this reason I do not wish to confine myself to a wheel having all the details shown and described, but rather to the details, whether combined as set forth or not.

I therefore claim as new and desire to secure by Letters Patent—

1. In a metallic wheel, the combination of a felly, a tire encircling the same, a hub, and spokes provided with permanent tenons which project through the felly and tire and are riveted down upon the latter to hold the parts together.

2. In a carriage or wagon wheel, the combination of the rabbeted tire, the channeled felly having its edges seated in the rabbets of the tire, the hub, and the spokes having solid tenons extending through the felly and tire and riveted down upon the latter.

3. In a carriage or wagon wheel, the combination of the rabbeted tire, the felly concavo-convex in cross-section, having its edges seated in the rabbets of the tire, the hub, and the spokes having tubular bodies and solid tenons, the latter projecting through the felly and tire and riveted down upon the latter.

4. In wheels, in combination, a tire, a felly composed of interlocked sections, and spokes extending continuously through the conjoining ends of the felly-sections and through the tire, whereby the tire and felly are bound together.

5. In a metal wheel, the combination of the tire, the hollow felly, the spokes inserted through the tire and felly and binding them together, and independent struts 8, encircling the spokes within the felly to prevent the crushing of the latter.

In testimony whereof I sign my name in the presence of two subscribing witnesses.

JNO. W. RHODES.

Attest:
FRANK I. MITCHELL,
ISAAC N. MITCHELL.